United States Patent Office 3,117,150
Patented Jan. 7, 1964

3,117,150
THIOUREA DERIVATIVES OF THIOPHOSPHATES
Paul M. Kerschner, Trenton, and Jack Ryer, East Brunswick, N.J., assignors to Cities Service Research and Development Company, New York, N.Y., a corporation of New Jersey
No Drawing. Filed June 29, 1961, Ser. No. 120,476
18 Claims. (Cl. 260—461)

This invention relates to new chemical compounds and more particularly to new organic compounds containing phosphorus, sulfur and nitrogen.

The present invention is directed to compounds of the general formula

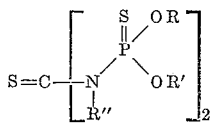

wherein R and R' are hydrocarbon radicals, alike or different, of from 2 to 20 carbon atoms selected from the group consisting of alkyl, alicyclic, aryl, aralkyl and alkaryl radicals and R'' is a radical selected from the group consisting of alkyl radicals of from 2 to 22 carbon atoms, alicyclic, aryl, alkaryl and aralkyl radicals of from 6 to 20 carbon atoms and mixtures thereof.

The new compounds of this invention are prepared by reacting a halogenated substituted thiophosphate with a primary amine. This reaction product is then reacted with carbon disulfide and the final product recovered. Quite unexpectedly these new compounds have been found to be excellent extreme pressure and extreme temperature additives for lubricant base stocks, both of the ordinary mineral oil type and of the synthetic type.

The preparation of the compounds of this invention is carried out by reacting one mole of the selected thiophosphate with one mole of a primary amine in an organic solvent. A molar excess of the amine reactant may also be used to insure completeness of reaction. This first reaction product is dissolved in an organic solvent such as toluene and carbon disulfide is added to the mixture. The mixture is brought to reflux temperature. After a suitable period of time, the final product is recovered. The solvents used in this preparation may be any suitable solvent boiling below the boiling points of the reaction products. Hydrocarbon solvents such as benzene and toluene are generally preferred.

The thiophosphates used in the preparation of these new compounds are substituted halogenated thiophosphates of the general formula

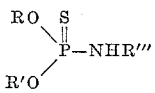

The halogen portion may be bromine, chlorine or iodine but in general chlorine is preferred. The R and R' components are hydrocarbon radicals, alike or different, such as ethyl, propyl, isopropyl, butyl, isobutyl, pentyl, iso pentyl, t-pentyl, hexyl, coclohexyl, heptyl, octyl, 2-ethylbenzyl, nonyl, decyl, 1-butylcyclohexyl, 3-cyclohexylpentyl, 10-benzyldecyl, dodecyl, tridecyl, tetradecyl, pentadecyl, hexadecyl, heptadecyl, octadecyl and eicosanyl.

The amines used in the preparation of these new compounds may be any primary amine such as aliphatic amines of from 2 to 22 carbon atoms, in straight or branched chain configuration, as well as, cyclic, aromatic, or substituted aromatic amines or mixtures of the same. Suitable amines are: propylamine, butylamine, isobutylamine, t-butylamine, pentylamine, benzylamine, cyclohexylamine, heptylamine, t-octylamine, 2-ethylhexylamine, 2,4-diethylcyclohexylamine, decylamine, undecylamine, dodecylamine, tridecylamine, 2-benzyloctylamine, and 2,2-dimethylcosanylamine. Particularly useful in the preparation of these new compounds are "Primene 81R" and "Primene JM–T," mixtures of tertiary alkyl primary amines having 12 to 14 carbon atoms and 18 to 22 carbon atoms respectively.

The reaction products of these amines and substituted halogenated thiophosphates are amidothiophosphates of the general formula:

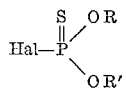

wherein R, R' and R''' are radicals as described above.

The examples which follow will provide a more complete understanding of the compounds of this invention and the manner in which they are prepared.

EXAMPLE 1

Into a three-neck, three liter flask equipped with a mechanical stirrer, a dropping funnel, a condenser and a thermometer, were placed 378 grams (2 mols) of diethylchlorothiophosphate and 400 ml. of benzene. The mixture was chilled to 0° C. and 800 grams (4 mols) of "Primene 81R" (a mixture of tertiary alkyl primary amines of from 12 to 14 carbon atoms) were added dropwise with stirring at such a rate as to maintain a temperature of 0 to 5° C. After all the "Primene 81R" has been added, the reaction was continued for an additional five hours at a temperature of 0°. The reaction mixture was then allowed to come to room temperature at which time approximately 300 ml. of water was added to dissolve the excess amine salt.

The aqueous layer was discarded and the organic phase was washed with two 250 ml. portions of a 5% sodium carbonate solution. The washed solution was then dried with anhydrous potassium carbonate. The benzene solvent and unreacted amine were stripped off by the distilling at reduced pressure.

352 grams (1 mol) of the first reaction product and 300 ml. of toluene were added to the apparatus described above. The mixture was rapidly stirred and again chilled to 0° C. 38 grams (0.5 mol) of carbon disulfide was added dropwise while maintaining the temperature of 0 to 5° C. After all of the CS$_2$ was added a reaction mixture was brought to a reflux temperature and the reaction was allowed to continue for 10 hours. The solvent was removed by distilling at reduced pressure. An analysis of the final reaction product showed 3.17% N and 8.3% of P (calculated values 3.75% N, 8.31% P).

EXAMPLE 2

According to the procedures set forth in EXAMPLE 1, 217 gm. (1 mol) of diisopropylchlorothiophosphate is reacted with 150 gm. (1 mol) of t-nonlyamine. 340 gm. (1 mol) of the product of the first reaction is reacted with 38 gm. (0.5 mol) of carbon disulfide. The final product was recovered as described.

EXAMPLE 3

Following the procedure of Example 1, 357 gm. (1 mol) of dioctylchlorothiophosphate is reacted with 370 gm. (2 mol) of dodecylamine. The product is washed with a 5% sodium carbonate solution. Drying is accomplished by the use of anhydrous potassium carbonate. 505 gm. (1 mol) of the dried product is then reacted with 38 gm. (0.5 mol) of carbon disulfide and the final product is recovered as described.

EXAMPLE 4

According to the procedures of Example 1, 413 gm. (1 mol) of didecylchlorothiophosphate is reacted with 258 gm. (2 mols) of t-octylamine and 505 gm. (1 mol) of that product is reacted with 38 gm. (0.5 mol) of carbon disulfide. Recovery of the final product is accomplished as described.

EXAMPLE 5

Following the procedure already set forth herein, 273 gm. (1 mol) of dipentylchlorothiophosphate is reacted with 630 gm. (2 mol) of "Primene JM–T" (a mixture of tertiary alkyl primary amines of from 18 to 22 carbon atoms). 551 gm. (1 mol) of the product of this first reaction is recovered as described and then reacted with 38 gm. (0.5 mol) of carbon disulfide.

EXAMPLE 6

According to the procedures set out in Example 1, 413 gm. (1 mol) didecylchlorothiophosphate is reacted with 146 gm. (2 mols) of tertiary butylamine. The product of this first reaction is recovered and 449 gm. (1 mol) thereof is reacted with 38 gm. (0.5 mol) of carbon disulfide. The final product is recovered by distillation under reduced pressure.

EXAMPLE 7

Into a three-neck, three liter flask equipped with a mechanical stirrer, a dropping funnel, a condenser and a thermometer, are placed 343 gm. (1 mol) of octylhexylchlorothiophosphate and 400 ml. of benzene. The mixture is chilled to 0° C. and 200 gm. (1 mol) of "Primene 81R" (a mixture of primary alkyl amines in the $C_{12}$ to $C_{14}$ range) is added dropwise with stirring, at such a rate that the reaction temperature is maintained within the range of 0° C. and 5° C. The reaction is continued for five hours. The reaction mixture is allowed to come to room temperature and 300 ml. of water are added.

The aqueous phase is discarded and the organic phase is washed with two 250 ml. portions of 5% sodium carbonate solution. The washed solution is dried with anhydrous potassium carbonate. The benzene solvent and unreacted amine are stripped off by distillation at reduced pressure.

506 gm. (1 mol) of the reaction product of the above reaction and 300 ml. of toluene are added to the equipment described above. The mixture is rapidly stirred and then chilled to 0° C. 38 gm. (0.5 mol) of carbon disulfide is added dropwise with stirring while maintaining the reaction temperature within 0° C. and 5° C. The reaction mixture is heated to reflux temperature and the reaction continued for 10 hours. The solvent is distilled off under reduced pressure.

One of the uses to which these new chemical compounds may be put is as additives for synthetic and mineral oil base stock lubricants. It has been found that the addition of a small amount of these additives to such lubricants greatly enhances their extreme pressure and anti-wear properties. A typical lubricating composition comprises a major portion of a mineral or synthetic base oil and a minor portion, sufficient to impart extreme pressure and anti-wear characteristics to the composition, of a phospho-thiourea compound described herein. The concentration of the phospho-thiourea compound in the oil is such that a phosphorus content in the final blend of from 0.04 to 0.80 weight percent is attained. The preferred phosphorus concentration range is from 0.08 to 0.40 weight percent.

The lubricating oil blend may be further improved to meet any desired requirement by incorporating therewith various other additives such as anti-oxidants, pour point depressants, viscosity index improvers, thickeners, soaps, and dyes. Typical anti-oxidants would include phenothiazine, 2,6-ditertiarybutyl-p-cresol, zinc dialkyl thiophosphates, and phenyl α-naphthol amine. Pour point depressants and VI improvers would include the polymeric acrylic esters and polyolefins. Thickeners would include alkali metal soaps of fatty acids, bentonite clays and silica gels.

To demonstrate the improvement in E.P. properties of lubricants, the compound of Example 1 was mixed with an ordinary 100 SUS mineral oil and a common synthetic lubricant (di-2-ethylhexyl sebacate) in 1, 5 and 10% concentrations. These mixtures were then subjected to the Shell 4 Ball Test. This test employs apparatus consisting of three ½" metal balls (type 52–100 steel) submerged in the lubricant to be tested in a metal cup. A rotating fourth ball of the same size and composition is forced into contact with the three fixed balls by an adjustable load arm and allowed to rub. At the points of contact, small circular scars begin to appear on the balls. The average diameter of these scars expresesd in mm. for a fixed load, speed of rotation and time period, is taken as a measure of wear. The results obtained from this test are shown in Table I.

*Table I*

EXTREME PRESSURE PROPERTIES AS DETERMINED BY THE SHELL 4-BALL MACHINE

| Sample No. | 1 | 2 | 3 | 4 | 5 | 6 | 7 | 8 |
|---|---|---|---|---|---|---|---|---|
| Base Stock | 100 neutral | 100 neutral | 100 neutral | 100 neutral | DEHS[1] | DEHS | DEHS | DEHS |
| Percent Additive, Example 1 | 0 | 1 | 5 | 10 | 0 | 1 | 5 | 10 |

| Applied Load, kg.: | Average Scar Diameter in mm. | | | | | | | |
|---|---|---|---|---|---|---|---|---|
| 40 | | | | | | | | |
| 50 | 0.50 | | | | 0.40 | | | |
| 60 | | | | | | | | |
| 70 | 2.70 | | | | 2.10 | | | |
| 80 | | | | | | | | |
| 90 | Weld | | | | | 0.50 | | |
| 100 | | 0.40 | | | 2.10 | | | |
| 110 | | | | | | 1.80 | | |
| 120 | | 1.80 | | | Weld | | | |
| 130 | | | | | | 2.40 | | |
| 140 | | 2.40 | | | | | 0.60 | 0.50 |
| 150 | | | | | | Weld | | |
| 160 | | Weld | 0.50 | 0.40 | | | 2.10 | 1.80 |
| 170 | | | | | | | | |
| 180 | | | Weld | 2.40 | | | 2.40 | Weld |
| 190 | | | | | | | | |
| 200 | | | | Weld | | | Weld | |
| Seizure | 60 | 110 | 170 | 170 | 60 | 100 | 150 | 150 |
| Weld | 80 | 150 | 170 | 190 | 110 | 140 | 190 | 170 |

[1] Di-2-ethylhexyl sebacate.

It will be noted that with no additive in the lubricants, seizure loads of only 45 and 55 respectively were obtained. However, with the addition of 5% of the product of Example 1, seizure loads of 170 and 150 were obtained. A corresponding increase in weld load was also experienced. It will be noted that using an amount of additive in excess of 5% showed no increase in lubricant properties.

To further demonstrate the extreme pressure characteristics of lubricants to which these compounds may be added, a base stock comprising 40% 200 neutral mineral oil and 60% 150 "Bright Stock" was prepared. A 5% mixture of the compound of Example 1 with this base stock was also prepared. These two mixtures were tested in the Timken Lubricant Tester. This apparatus includes a rotating cup which is brought into contact with a fixed test block. The lubricant to be tested is placed between the cup and the block with an adjustable load arm forcing the test block firmly against the rotating cup. After a fixed period of time, the test block is removed and examined for wear. The condition of the test block is taken as a measure of the film strength of the tested lubricant. The results of the tests run on this equipment are shown in Table II.

Table II

TIMKEN LUBRICANT TEST

| Base stock | Additive, example 1 | Percent, additive, example 1 | OK load (lb.) | Scar diam. (mm.) | Condition of West block |
|---|---|---|---|---|---|
| 40% 200 Neutral; 60% 150 Bright Stock | | | 0 | 10 | 0.9 | Pass. |
| Do | | | 0 | 15 | | Fail. |
| Do | A | 5 | 40 | 1.2 | Pass. |

The significant fact to be learned from the above table is that the film strength of the lubricant containing the additive was roughly four times greater than that of the straight base stock.

It is clear from the evidence presented herein that these new compounds are excellent lubricant additives.

The compounds of this invention may also find application as disinfectants, hydraulic fluid additives and insecticides.

It is obvious that many modifications of this invention may be made. It is intended that the scope of this invention be limited solely by the claims appended hereto.

We claim:

1. A compound of the formula:

$$\left[ S=C-N \begin{matrix} R'' \end{matrix} \begin{matrix} S \\ \| \\ P \end{matrix} \begin{matrix} OR \\ OR' \end{matrix} \right]_2$$

wherein each of R and R' is a hydrocarbon radical selected from the group consisting of cyclohexyl, phenyl, phenalkyl and alkphenyl having from 6 to 20 carbon atoms and alkyl having from 2 to 20 carbon atoms and R'' is hydrocarbon radical selected from the group consisting of cyclohexyl, phenyl, phenalkyl and alkphenyl having from 6 to 20 carbon atoms and alkyl having from 2 to 22 carbon atoms.

2. As a new composition of matter, the compound $$\left[ S=C-N \begin{matrix} R'' \end{matrix} \begin{matrix} S \\ \| \\ P \end{matrix} \begin{matrix} OR \\ OR' \end{matrix} \right]_2$$

wherein R and R' are alkyl of 2 to 20 carbon atoms and R'' is an alkyl of from 2 to 22 carbon atoms.

3. The compound of claim 2 wherein R and R' are ethyl and R'' is $$-\underset{CH_3}{\overset{CH_3}{\underset{|}{C}}}-x$$

wherein x is a mixture of aliphatic groups of from 9 to 11 carbon atoms.

4. The compound of claim 2 wherein R and R' are pentyl and R'' is $$-\underset{CH_3}{\overset{CH_3}{\underset{|}{C}}}-y$$

wherein y is a mixture of aliphatic groups of from 15 to 19 carbon atoms.

5. The compound of claim 2 wherein R and R' are isopropyl and R'' is a t-nonyl.

6. The compound of claim 2 wherein R and R' are octyl and R'' is a dodecyl.

7. The compound of claim 2 wherein R and R' are decyl and R'' is a t-octyl.

8. The compound of claim 2 wherein R and R' are decyl and R'' is a t-butyl.

9. The compound of claim 2 wherein R is octyl, R' is hexyl and R'' is $$-\underset{CH_3}{\overset{CH_3}{\underset{|}{C}}}-x$$

wherein x is a mixture of aliphatic groups of from 9 to 11 carbon atoms.

10. A method of preparing phospho thiourea compounds which comprises reacting a dialkyl halothiophosphate with a primary amine in a molar ratio of 1:1 in the presence of a solvent, removing excess solvent by distillation, reacting the reaction product with carbon disulfide in a solvent medium, and recovering the final product.

11. A method of preparing phospho thiourea compounds which comprises reacting one mol of a dialkyl chlorothiophosphate with one mol of a primary amine in the presence of a low boiling hydrocarbon solvent, removing excess solvent by distillation, reacting one mol of the reaction product with 0.5 mol of carbon disulfide in the presence of a low boiling hydrocarbon solvent, and recovering the final product.

12. A method of preparing phospho thiourea compounds which comprises reacting one mol of diethylchlorothiophosphate with one mol of a primary amine in the presence of a solvent amount of benzene, removing excess benzene by distillation, reacting one mol of the reaction product with 0.5 mol of carbon disulfide in the presence of a solvent amount of toluene, stripping off excess solvent, and recovering the final product.

13. The process of claim 12 wherein the primary amine is a mixture of tertiary alkyl primary amines having from 12 to 14 carbon atoms.

14. The process of reacting one mol of dipentylchlorothiophosphate with one mol of a mixture of primary amines of the general formula $$H_2N-\underset{CH_3}{\overset{CH_3}{\underset{|}{C}}}-X$$

wherein X is an aliphatic group of from 15 to 19 carbon atoms, in the presence of a solvent amount of benzene, maintaining the temperature of the reaction solution at 0° C. until no further HCl is evolved, stripping off the HCl and excess benzene, reacting one mol of the reaction product with 0.5 mol of carbon disulfide in the presence of a solvent amount of toluene under reflux conditions at 0 to 5° C., and recovering the final product by distilling off excess solvent.

15. The process of claim 10 wherein the disubstituted halothiophosphate is diisopropylchlorothiophosphate and the primary amine is t-nonylamine.

16. The process of preparing phospho thiourea compounds which comprises reacting one mol of didecylchlorothiophosphate with one mol of t-octylamine in the presence of a solvent amount of benzene, maintaining the temperature of the reaction solution at 0° C. for 5 hours, allowing the mixture to come to room temperature, stripping off excess benzene and HCl, reacting one mol of the reaction product with 0.5 mol of carbon disulfide in the presence of a solvent amount of toluene, refluxing the reaction mixtures at 0° to 5° C. for 10 hours, and recovering the final product by distilling off the solvent.

17. The process of reacting 2 mols of diethylchlorothiophosphate with 4 mols of a mixture of tertiary alkyl primary amines having from 12 to 14 carbon atoms, in the presence of 400 ml. of benzene at a temperature of 0° C. for five hours, allowing the mixture to warm to room temperature, stripping off the HCl evolved, washing the mixture with a 5% sodium carbonate solution, stripping off the benzene and unreacted amine by distillation under reduced pressure, reacting one mol of the reaction product with carbon disulfide in 300 ml. of toluene, refluxing the reaction mixture for 10 hours at 0 to 5° C., and recovering the final product by distilling off the toluene under reduced pressure.

18. A method of preparing phospho thiourea compounds comprising reacting carbon disulfide in a solvent medium with an amidothio phosphate having the formula:

wherein R and R' are hydrocarbons selected from the group consisting of alkyl of from 2 to 20 carbon atoms, alicyclic, aryl, aralkyl and alkaryl of from 6 to 20 carbon atoms and R'' is selected from the group consisting of alkyl of from 2 to 22 carbon atoms, alicyclic, aryl, aralkyl and alkaryl of from 6 to 20 carbon atoms.

References Cited in the file of this patent
UNITED STATES PATENTS
2,875,233    Blair et al. _____ Feb. 24, 1959